(12) United States Patent
Lausi

(10) Patent No.: US 6,694,132 B1
(45) Date of Patent: Feb. 17, 2004

(54) METHOD FOR TELEPHONE BROADCASTING VOICE MESSAGES OR THE LIKE INTO DEFINED GEOGRAPHICAL AREAS

(75) Inventor: Carmine Lausi, Salerno (IT)

(73) Assignee: Alcatel, Paris (FR)

( * ) Notice: Subject to any disclaimer, the term of this patent is extended or adjusted under 35 U.S.C. 154(b) by 451 days.

(21) Appl. No.: 09/667,519

(22) Filed: Sep. 22, 2000

(30) Foreign Application Priority Data

Sep. 23, 1999 (IT) .......................................... MI99A1970

(51) Int. Cl.$^7$ .............................. H04Q 7/22; H04Q 7/24; H04Q 7/20
(52) U.S. Cl. ................................. 455/404.1; 455/404.2; 455/521; 455/3.04; 455/426.1; 379/41; 379/48; 379/37; 379/67.1
(58) Field of Search ................................. 455/404, 403, 455/3.01, 3.03, 3.04, 412.1, 426.1, 445, 500, 521, 517; 379/41, 48, 37, 67.1, 70, 84, 209.1, 40

(56) References Cited

U.S. PATENT DOCUMENTS

| | | | |
|---|---|---|---|
| 5,166,972 A | * 11/1992 | Smith | ........................... 379/40 |
| 5,768,359 A | * 6/1998 | DiPierro, Jr. et al. | ........ 379/209 |
| 6,021,177 A | * 2/2000 | Allport | .......................... 379/48 |
| 6,169,894 B1 | * 1/2001 | McCormick et al. | ........ 455/414 |
| 6,201,856 B1 | * 3/2001 | Orwich et al. | ................. 379/40 |

\* cited by examiner

*Primary Examiner*—William Trost
*Assistant Examiner*—Keith Ferguson
(74) *Attorney, Agent, or Firm*—Sughrue Mion, PLLC

(57) ABSTRACT

A method is described for telephone broadcasting warnings, information or the like into defined geographical areas. The method provides for: dividing the interested area into geographic zones; associating with the directory number of each fixed telephone set an information indicating the geographic zone inside which said fixed telephone set is installed; providing each public telephone exchange with geographic zone information related to the directory number controlled by it; where requested, providing the text of a message and the list of the geographic zones to which such message is to be sent; and having all the directory numbers associated with the interested geographic zones automatically called by the telephone exchanges. In particular, the message could concern the announcement of impending natural calamities.

19 Claims, 2 Drawing Sheets

METHOD FOR TELEPHONE BROADCASTING VOICE MESSAGES OR THE LIKE INTO DEFINED GEOGRAPHICAL AREAS

BACKGROUND OF THE INVENTION

1. Field of the Invention

The present invention relates to the telephony art and in particular it is concerned with the telephone broadcasting of alarm, public utility, advertising, voice messages or the like, into defined geographical areas.

2. Description of the Prior Art

In several circumstances a need exists for broadcasting a special message into a determined geographical area. The message could concern the announcement of impending natural calamities (floods, landslides, eruptions, hurricanes, etc. . . . ), the communication of a near interruption in the provision of services (power, water, gas, etc. . . . ) or of serious problems connected therewith (e.g. drinking water pollution), the danger of war attacks, advertising information, traffic jams/accidents information or the like.

So far, all these messages have been sent via "conventional" methods like by means of sirens, loudspeakers mounted on vehicles driving in the target areas, or via mass-media (newspapers, radio, TV). The use of such conventional methods has serious drawbacks.

In particular, sirens provide only generic alarm indications (which are often hard to interpret, especially in circumstances of panic), they need to be previously installed at several definite locations and lastly they might be not heard by people living far away from the installation points. As far as the loudspeakers mounted on vehicles are concerned, the spread of the message requires a lot of time and people for driving the vehicles (in case of calamity often it is impossible to move around or it might be difficult to drive along streets crowded by panic-stricken people) and the message might not be heard by people living in the suburbs, in isolated houses or in minor streets. Through mass media, people are reached by the message only in a much delayed way and, above all, media do not reach most of the people which do not access that particular communication means in a certain period of time. At any rate, none of the above methods is able to establish if, how many, and which people have become aware of the message.

In an attempt to overcome the above drawbacks, the Canadian patent application n. 2.153.096 disclosed a method of announcing or alerting people to an emergency or other events by means of an audible message transmitted to household telephones by means of public switched telephone networks. The method of the Canadian patent application is based on the use of the IVR (Interactive Voice Response) system which requires equipment outside the public telephone exchange. Such a system is improper for large-scale use in spreading urgent messages since it necessarily requires a lot of additional apparatuses in addition to those already installed; moreover, connections between the outside apparatuses and the public telephone exchanges act as a "bottle neck" whereby the calls are necessarily serialized, thus bringing the message broadcasting time up to levels which are considered unacceptable for urgent messages such as e.g. those concerned with impending calamities. A further serious drawback of such a system is that it can not be used for cellular telephones thus excluding a lot of people potentially interested in receiving the message.

SUMMARY OF THE INVENTION

In view of the prior art drawbacks mentioned above, the main object of the present invention is to provide a method for telephone broadcasting messages into defined geographical areas swhich is effective, speedy and that allows the message to be sent to a lot of people provided with a fixed or cellular telephone.

A further object of the present invention is to provide a method that allows the verification as regards the messages actually received by the receivers.

Still another object of the present invention is to provide a method which substantially does not require any additional equipment for the implementation thereof but substantially utilizes the equipment already available at the existing telephone exchanges.

These and further objects are achieved by the a method for telephone broadcasting warnings, information or the like into a target defined geographical area through a telephone system comprising one or more public telephone exchanges and a plurality of fixed subsets with a corresponding directory number associated therewith, wherein the method comprises the steps of: dividing the target area into geographical zones; associating with the directory number of each fixed telephone subset an information indicating a geographical zone inside which the fixed telephone subset is installed; providing each public telephone exchange with the geographical zone information related to the directory numbers controlled thereby; providing the telephone exchanges with the list of geographical zones which such message is to be sent to; and causing the telephone exchanges to automatically make a call to all the directory numbers associated with the target geographical zones. The method may also include the step of providing the telephone exchange with the text of a registered message, and the step of calling comprises the step of broadcasting the requested recorded message to the users.

Further advantageous characteristics of the invention will be apparent from the description and claims below.

The basic idea is to automatically telephone to all the target people and provide them with a recorded announcement containing the message to be broadcasted. The proposed solution proves to be very flexible and allows several possibilities that can be chosen in accordance with the type of message to be broadcasted, the size of the area into which to spread the message, the required precision, the number of people to be alerted, the time that can be devoted to the spreading of the message, and so on.

The invention will certainly become clear after reading the following detailed description, given by way of a mere non limiting example, with reference to the annexed figures.

DESCRIPTION OF THE BEST MODE FOR CARRYING OUT THE INVENTION

Figure 1:
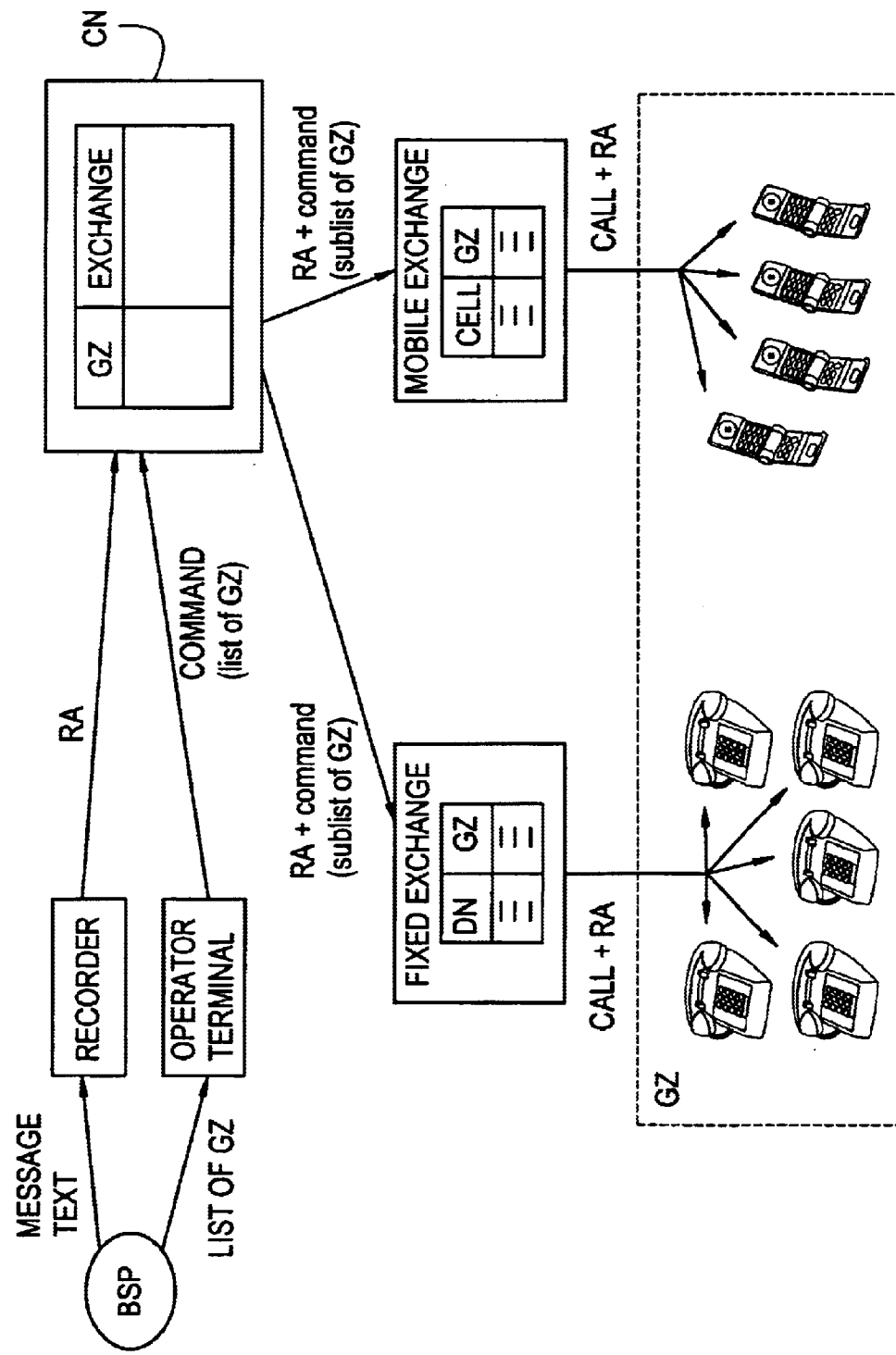
FIG. 1 schematically illustrates the method according to the present invention basic arrangement.

The basic solution which will be described at first (FIG. 1) is applicable to messages to be broadcasted in a medium/short time (for instance within one hour) into a rather small geographical area (for instance a city quarter).

At present, every fixed telephone exchange contains, for each directory number, hereinafter abbreviated to DN, connected thereto, a set of data related to that number (for instance the enabled additional services, the type of line, etc. . . . ). The invention at first provides for adding a new field, for instance in the form of a number, defining the geographical zone in which the telephone user is and which will be abbreviated to GZ hereinafter.

A telephone message broadcasting service provider, abbreviated to BSP, which could for instance be the Civil Protection, shall divide the geographical area (GA), wherein the message broadcasting service has to be available, into geographical zones (GZ) and shall send this information to the telephone service provider, abbreviated to TSP. The TSP shall use this information to assign a relevant GZ value to each DN included in the data base (DB) of its telephone directories and will load this value on the telephone exchange controlling that DN in the new field mentioned above.

By way of example only, a GZ might be associated with a list of streets. A software program could scan the DB of the telephone directories assigning that GZ to all the subscribers whose address is contained in the associated list of streets.

When a message has to be broadcasted via telephone lines, the BPS will identify the geographical area wherein the message is wished to be spread (target area) for instance through a Graphical User Interface (GUI) on a computer and will write, still via computer, the text of the message to be broadcasted. For example, such a message, in case of inundations, could provide instructions to be followed: "leave your house quickly going towards the X direction" (the direction could be different according to the different GZs in order to avoid traffic jams during evacuation) in those GZs that, in all likelihood, will be inundated within a certain time interval, and vice versa "stay at home sealing balconies and windows" in those GZs already inundated.

The GUI will automatically translate the target area into a list of GZs and will send this list and the text of the message to a TSP operator. The latter will record the message into a recorded announcement (RA), it will record this in the relevant exchange(s) along with the list of GZs, and finally it will send the command for broadcasting the message, for instance MESSAGE BROADCAST (the software applications of both the BSP and TSP can also be integrated so as to minimize the starting times).

The exchange will automatically call all the relevant DNs (optionally with a distinctive ring tone and/or a different frequency) and, when the subscriber answers, it will announce the recorded announcement RA.

If one of the DNs to be called is engaged, the exchange, as a rule, will call it again as soon as the conversation is ended. However, in the case where the message is very urgent, for instance to announce an impending natural calamity, it is provided that the exchange may intrude itself in the conversation in process and announce the recorded announcement RA.

If, on the other hand, the call to a DN does not receive an answer, the exchange will leave the message RA in the voice-mail box of the DN should the latter make use of the voice mail service, or it will call again that DN a number of times after a pre-established time interval.

In any case, the exchange will maintain a list of those DNs to which it was unable to send the message along with the relevant reason (e.g. no reply); such a list can be provided to the BSP that had requested the service.

The mechanism described above is applicable to fixed-telephony exchanges and therefore to subscribers of the fixed telephone network but a rather similar mechanism may naturally be applied also to mobile-telephony exchanges. In this latter case also the mobile-telephony exchanges will receive the recorded announcement and the list of the GZs, but the GZs will be internally associated with the radio cells and not with the DNs. In this way the calls will automatically be sent to all the customers of the mobile network which in that moment are recorded within the cells associated with the relevant GZ. This option allows the messages to be broadcasted to a much higher number of people: it is clear that in many instances, people being not at home are just those who need to be informed to a greater extent on particular situations or calamities such as for instance inundations, handfalls or the like.

A further embodiment of the solution described above is the one outlined hereinafter, applicable to "general alarms" (without text messages) to be broadcasted in a very short time (for instance few minutes). In this case the exchange could send only one specific ring (for instance a ring at a different frequency, a continuous signal, etc. . . . ) instead of the recorded announcement. The subscribers should be instructed in advance on the meaning of the different rings and the corresponding behavior to be adopted. This embodiment is particularly suited for drivers who are provided with cellular phones and should become aware of car accidents, vehicles queues, work in progress, bad wheather conditions or any other situation requiring the vehicle to slow down.

A still further embodiment is particularly suited for advertising messages: in this instance, in addition to the code defining a GZ, special number/codes providing further information on the subscriber (man/woman, single/married, graduated, diplomed, without degree, type of job, age/year of birth, . . . ) could be associated with each DN. In this case the BSP, besides providing the RA and the list of GZs, shall provide the list of codes for which the message broadcast is established; the exchanges will send the RA only to the users associated with the codes and the GZs indicated by the BSP. In this way, just to give an example, those who are potentially interested in a sales promotion or in the opening of a new shop in a particular zone, will be informed accordingly.

Figure 2:
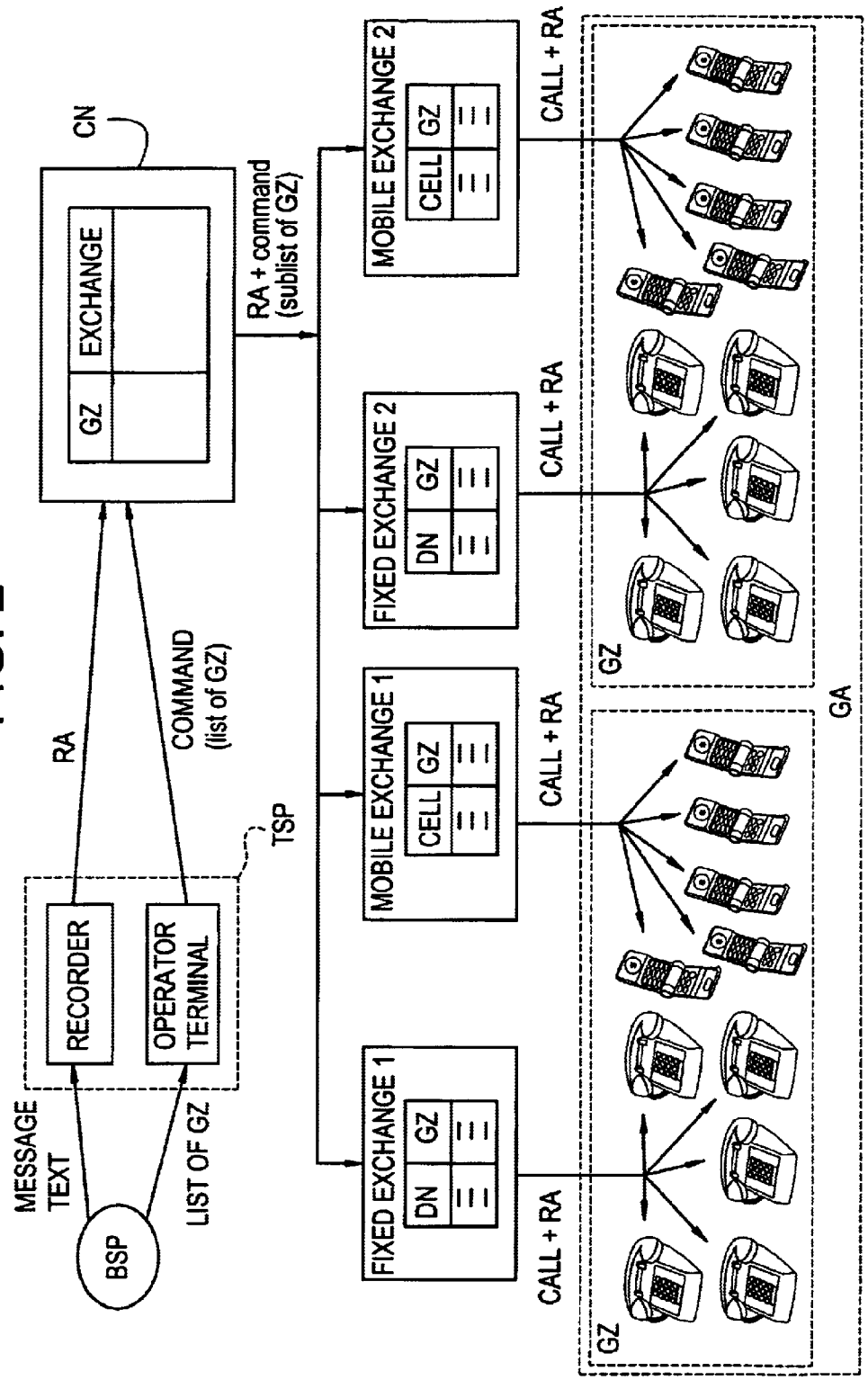
FIG. 2 schematically illustrates the method according to the present invention in an arrangement which is modified with respect to the basic one and is suitable for larger areas.

An alternative, hereinafter described with reference to FIG. 2, to the basic proposal is more suitable for large geographical areas GA such as big cities or the like. When the interested area is very large, the involved exchanges may be a lot. In this instance, the message broadcasting service, could be controlled in a centralized node (CN) and by the latter, the commands could be sent to the various exchanges. In this case a centralized data base would contain an association of the GZs with the exchanges; when the TSP receives the message text and the list of the GZs from the BSP, the CN will record the message and send the recorded announcement and the related sublist of GZs to each of the exchanges that control at least one of the target GZs.

The centralized node could be an Intelligent Network Service Control Point (SCP) and in this case the commands with the recorded announcement could be sent to the exchanges via the intelligent network interface. As an alternative, it could be an Operation & Maintenance Center (OMC) that will send remote commands and download the recorded announcement to the interested exchanges.

Yet another option could be utilized in the case where the invention is not implemented in all the telephone exchanges connected to which are the relevant geographical area (GA). Let us define, for simplicity, SP (Service Provider) exchanges as those exchanges in which the invention is implemented and non-SP exchanges the remaining ones. In such case the TSP will manage a DB containing all the DNs connected to non-SP exchanges; associated with each DN will be the relevant GZ and the identity of an SP exchange, for instance the SP closest to the interested DN. When the usual request (RA+list of GZs) from the BSP arrives, the TSP will derive from the list of the DNs belonging to such GZs but connected to non-SP exchanges and send the sublist of the DNs which said SP exchange has to call, still being not directly connected thereto, to each of the SP exchanges associated with these DNs in the DB. Finally, the SP exchanges, for each DN of the received sublist, will send a call that will automatically be rounded towards the exchange connected to the DN and, as soon as the user answers, the SP exchange sends the announcement RA.

Such an option requires a broadcasting time which is longer than in the general case, as the connections between the service provider exchange and the one which is connected to the interested DNs, restrict the number of calls that can be sent in parallel; moreover, the sending of the list of the DNs to be called requires a time wich is rather longer than the one necessary for the simple list of GZs.

In view of the above detailed description, the advantages of the present invention will now be apparent. Firstly, the method is very flexible and can be applied to many types of messages to be broadcasted into large, medium or small areas. The messages could concern risks of impending natural calamities, temporary unavailability of public services, advertising information, etc. Secondly, the method of the invention proves to be very accurate since all people who are, even temporarily, in the target area and who have a cellular or fixed telephone (in practice almost all people) will be individually reached and can hear clearly that message.

Moreover, the method is definitely fast and in particular, the time necessary for broadcasting the message is practically independent of the overall number of subscribers to be reached but it is mainly dependent (for dimensioning reasons) only on the percentage of subscribers to be informed for each exchange with respect to the overall number of subscribers handled by that exchange. In the worst case, using the existing technologies, if an exchange has to inform 100% of its subscribers, the time required for broadcasting a recorded announcement RA already available in the exchange will be from 20 to 30 minutes, but when the percentage is lower, the overall time decreases proportionally. Using the currently available technology, in the case where one wishes to broadcast e.g. a message to half the people of a city of 100,000 inhabitants, all connected to the same local exchange, the overall time can be estimated as follows: from 5 to 10 minutes to record the RA, load it on the exchange and send the command, and from 10 to 15 minutes to broadcast the announcement RA to the subscribers at issue, hence about 20 minutes in total. Should the number of exchanges be higher, the required time would be almost unchanged, since the broadcasting through the exchanges occurs in parallel.

Among the undoubted advantages of the method according to the present invention is that of requiring a much reduced number of people for carrying out it. In fact, once the BSP has provided the text of the message and the list of the target zones, only one operator is necessary for recording the message, loading it and sending it to the exchange (possibly via CN) also for broadcasting messages into very large areas. It is clear that this aspect proves to be extremely advantageous in case of emergency and calamities.

As to the implementation of the method according to the invention, it could be realized with several of the digital exchanges at present in existence, such as e.g. the Alcatel A 1000-S12 exchanges or the like.

There has thus been shown and described a novel method which fulfills all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. A method for telephone broadcasting an announcement into a target defined geographical area through a telephone system comprising one or more public telephone exchanges related to said target defined geographical area, wherein said telephone system further comprises a plurality of fixed telephone sets, each having a corresponding directory number associated therewith, wherein the method comprises:

dividing said target defined geographical area into geographical zones;

providing text of the announcement to be broadcasted and a list of target geographical zones, wherein a broadcasting service provider provides the announcement and the list to a telephone service provider, which records the announcement locally;

providing said public telephone exchanges with a list of geographical zones to send the recorded announcement, wherein the telephone service provider sends the recorded announcement and a command comprising a list of one or more geographical zones;

associating information indicating a geographical zone with the directory number of each of said fixed telephone sets located in said geographical zone;

causing said public telephone exchanges to automatically call all fixed telephone sets associated with the list of geographical zones in order to broadcast the recorded announcement; and broadcasting the recorded announcement.

2. The method according to claim 1, wherein the method further comprises announcing said call by a ring having a different tone and/or a different frequency.

3. The method according to claim 1, wherein, when the line of the directory number to be called is engaged, the exchange transmits the call as soon as the line is free again.

4. The method according to claim 1, wherein, when the line of the directory number to be called is engaged and the recorded announcement is urgent, the telephone exchange will intrude by announcing the recorded announcement.

5. The method according to claim 1, wherein, when the call to a directory number does not receive an answer, the exchange leaves the recorded announcement in a directory number voice-mail, if possible, or calls that directory number for a number of times at predetenmined time intervals.

6. The method according to claim 1, wherein the exchange will keep a list of directory numbers to which it was unable to send the recorded announcement, along with the non-delivery reason.

7. The method according to claim 1, wherein said recorded announcement comprises at least alarm messages, public utility messages and advertisements.

8. The method according to claim 1, wherein a field comprising the information inserted in a data base of the telephone exchanges for each directory number comprises data related to the subscriber corresponding to that directory number able to identify the subscribers potentially interested in a certain recorded announcement.

9. The method according to claim 1, wherein, if the geographical zones interested in the recorded announcement are controlled by exchanges that do not support broadcasting an announcement into a target defined geographical area, the telephone service provider derives, by means of a data base, the list of directory numbers to be called and the associated exchanges that support broadcasting an announcement into a target defined geographical area, the relevant sublists of directory numbers are sent to the associated SP exchanges, which will provide for calling such directory numbers passing through other non-SP exchanges, and for sending them the recorded announcement.

10. A method for telephone broadcasting an announcement into a target defined geographical area through a telephone system comprising one or more public telephone exchanges related to said target defined geographical area, wherein said telephone system further comprises a plurality of fixed telephone sets, each having a corresponding directory number associated therewith, wherein the method comprises:

dividing said target defined geographical area into geographical zones;

providing text of the announcement to be broadcasted and a list of target geographical zones, wherein a broadcasting service provider provides the announcement and the list to a telephone service provider that records the announcement in a centralized node containing an association of the geographical zones with the exchanges;

providing said public telephone exchanges with a list of geographical zones to send the announcement, wherein the centralized node will send the recorded announcement and a command, comprising a subset of geographical zones to each of the relevant telephone exchanges;

associating information indicating a geographical zone with the directory number of each of said fixed telephone sets located in said geographical zone;

causing said public telephone exchanges to automatically call all telephone sets associated with the list of geographical zones in order to broadcast the recorded announcement; and broadcasting the recorded announcement.

11. The method according to claim 10, wherein said centralized node is an Intelligent Network Service Control Point and the commands and the recorded announcement are sent to the telephone exchanges via Intelligent Network.

12. The method according to claim 10, wherein said centralized node is an Operation & Maintenance Center that sends remote Operation & Maintenance commands and downloads the recorded announcement to the exchanges.

13. A method for telephone broadcasting an announcement into a target defined geographical area through a telephone system comprising one or more public telephone exchanges related to said target defined geographical area, wherein said telephone system comprises one or more mobile telephone exchanges comprised in cellular phone networks divided into radio cells, and a plurality of cellular phones, wherein the method comprises:

dividing said target defined geographical area into geographical zones;

providing text of an announcement to be broadcasted and a list of target geographical zones, wherein a broadcasting service provider provides the announcement and the list to a telephone service provider, which records the announcement locally, providing said mobile telephone exchanges with a list of geographical zones to send the recorded announcement, wherein the telephone service provider sends the recorded announcement and a command comprising a list of one or more geographical zones;

associating information indicating a geographical zone with each of said radio cells;

causing said mobile telephone exchanges to automatically call all cellular phones that are possibly registered in the said radio cells in order to broadcast the recorded announcement; and broadcasting the recorded announcement.

14. The method according to claim 13, wherein the method further comprises announcing said call by a ring having a different tone and/or a different frequency.

15. The method according to claim 13, wherein, when the line of the directory number to be called is engaged, the exchange transmits the call as soon as the line is free.

16. The method according to claim 13, wherein the exchange will keep a list of directory numbers to which it was unable to send the recorded announcement, along with the non-delivery reason.

17. The method according to claim 13, wherein a field comprising the information inserted in a data base of the telephone exchanges for each directory number comprises data related to the subscriber corresponding to that directory number able to identify the subscribers potentially interested in a certain recorded announcement.

18. The method according to claim 13, wherein, if the geographical zones interested in the recorded announcement are controlled also by exchanges that do not support broadcasting an announcement into a target defined geographical area, the telephone service provider derives, by means of a data base, the list of directory numbers to be called and the associated exchanges that support broadcasting an announcement into a target defined geographical area, the relevant sublists of directory numbers are sent to the associated SP exchanges, which will provide for calling such directory numbers passing through other non-SP exchanges, and for sending them the recorded announcement.

19. A method for telephone broadcasting an announcement into a target defined geographical area through a telephone system comprising one or more public telephone exchanges related to said target defined geographical area, wherein said telephone system comprises one or more mobile telephone exchanges comprised in cellular phone networks divided into radio cells, and a plurality of cellular phones, wherein the method comprises:

dividing said target defined geographical area into geographical zones;

providing text of an announcement to be broadcasted and a list of target geographical zones, wherein a broadcasting service provider provides the announcement and the list to a telephone service provider, which records the announcement in a centralized node containing an association of the geographical zones with the mobile telephone exchanges, providing said public telephone exchanges with a list of geographical zones to send the recorded announcement, wherein the centralized node will send the recorded announcement and a command, comprising a subset of geographical zones to each of the relevant mobile telephone exchanges;

associating information indicating a geographical zone with each of said radio cells;

causing said mobile telephone exchanges to automatically call all cellular phones that are possibly registered in the said radio cells in order to broadcast the recorded announcement; and broadcasting the recorded announcement.

* * * * *